United States Patent
Lentz et al.

[11] Patent Number: 6,164,434
[45] Date of Patent: Dec. 26, 2000

[54] APPARATUS FOR TRANSPORTING PROFILES

[75] Inventors: Gerhard Lentz, Niederhausen; Michael Tomtzig, Hattersheim, both of Germany

[73] Assignee: Oxytechnik Gesellschaft für Systemtechnik mbH & Co. KG, Wiesbaden, Germany

[21] Appl. No.: 09/121,222

[22] Filed: Jul. 23, 1998

[30] Foreign Application Priority Data

Jul. 30, 1997 [DE] Germany .................. 197 32 795

[51] Int. Cl.⁷ .................................................. B65B 47/00
[52] U.S. Cl. ............... 198/468.2; 198/780; 198/345.1; 198/411; 193/356; 193/45; 193/35 R; 414/16; 414/20
[58] Field of Search ................... 198/780, 782, 198/824, 345.1, 346, 375, 376, 836.1, 468.2, 468.7, 411; 193/35 C, 45, 35 R; 414/16, 20

[56] References Cited

U.S. PATENT DOCUMENTS

| | | | |
|---|---|---|---|
| 3,143,217 | 8/1964 | Andersen | 198/468.2 X |
| 3,901,378 | 8/1975 | Rolland | 193/35 C X |
| 4,147,259 | 4/1979 | Nilsson | 198/486 X |
| 4,628,781 | 12/1986 | Rowley | 198/468.2 X |
| 4,693,761 | 9/1987 | Bohm et al. | 148/9 R |
| 4,727,787 | 3/1988 | Schlosser | 83/522 |
| 5,011,001 | 4/1991 | Cameron | 198/468.2 |
| 5,033,610 | 7/1991 | Lehmler et al. | 198/782 |
| 5,724,246 | 3/1998 | Heil | 198/468.21 |

*Primary Examiner*—Jospeh E. Valenza
*Assistant Examiner*—Richard Ridley
*Attorney, Agent, or Firm*—Henry M. Feiereisen

[57] ABSTRACT

Apparatus for transporting profiles of different size and cross section, such as flats, angles, I sections, U sections, T sections and bulb sections, in longitudinal direction, includes a plurality of support elements for transporting the sections along a transport path, a stop mechanism arranged laterally of the support elements along the transport path, and a clamping device movable in the direction of the transport path, wherein each support element is formed by two rollers, with at least one of the rollers being movable with respect to the other one of the rollers.

5 Claims, 2 Drawing Sheets

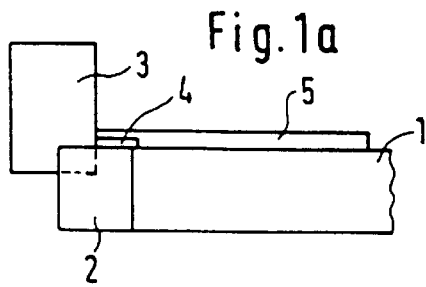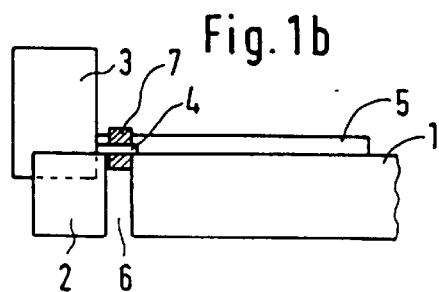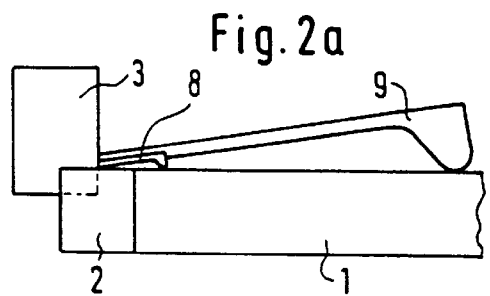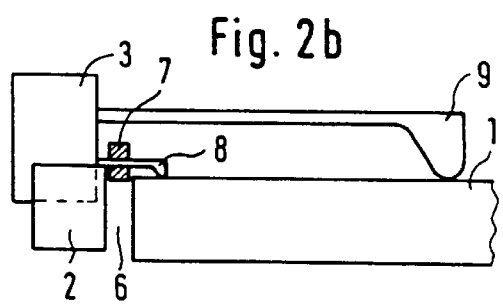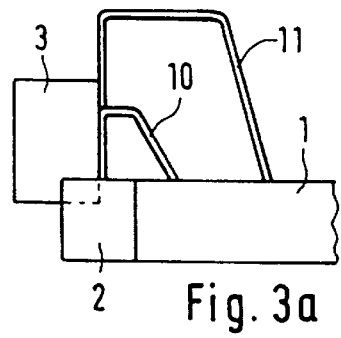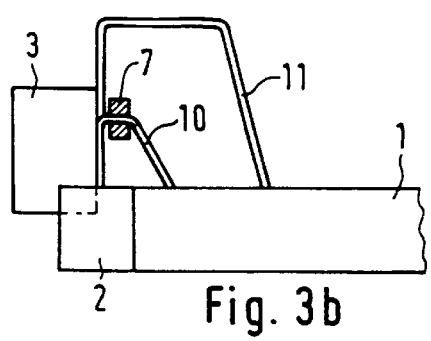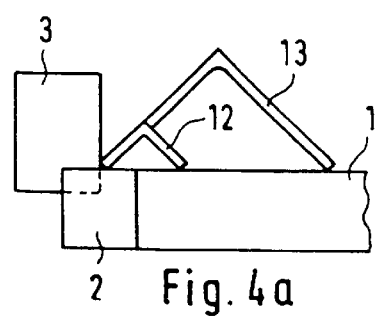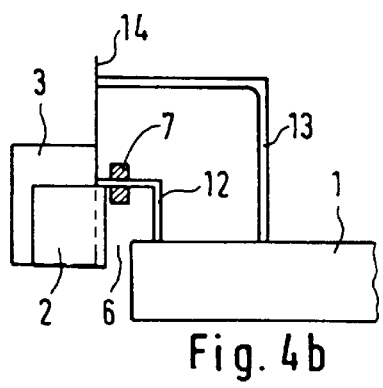

APPARATUS FOR TRANSPORTING PROFILES

BACKGROUND OF THE INVENTION

The present invention relates to an apparatus for transporting profiles, such as flats, angles, I sections, U sections, T sections or bulb profiles, of different sizes and cross sections, in profile processing plants for handling, e.g. cutting or welding profiles by thermal or electric tools.

U.S. Pat. No. 4,693,761, issued Sep. 15, 1987, discloses an apparatus for the thermal separation of profiles with a cutting torch, including a roller table having a track which is formed by spaced-apart roller-type support elements. A plurality of stop rollers border the longitudinal side of the roller track and are arranged perpendicular to the support elements. Positioned at the profile feed end of the roller track is a clamping device which clasps the profiles and holds them tightly against the support elements and the stop rollers, and is movable in vertical and horizontal directions.

U.S. Pat. No. 5,033,610, issued Jul. 23, 1991, describes an apparatus for position-stable transport of profiles for subsequent advance to a cutting station, which apparatus includes a roller table having a plurality of disk-shaped support elements spaced in the longitudinal conveying direction. A plurality of stop rollers are arranged next to the roller track perpendicular to the support elements which are slideably guided for horizontal movement to suit the size and cross section of the profile being handled.

SUMMARY OF THE INVENTION

It is an object of the present invention to provide an improved apparatus for the transport of profiles, which apparatus has support elements so designed as to simplify adaptation to the size and cross section of the profiles during loading and transport thereof.

This object, and others which will become apparent hereinafter, is attained in accordance with the present invention by providing the support elements in the form of two rollers, with at least one of the rollers being slideable with respect to the other roller.

Through the configuration of the support elements in accordance with the present invention, it is advantageously attained that the rollers can be moved relative to one another when the roller table is loaded laterally e.g. via a suitable transverse conveyor, to thereby provide an uninterrupted, leveled support path toward the stop rollers. Unlike the prior art, also bulb sections, T sections or angles can now be conveyed transversely toward the stop rollers, preferably by chain conveyors or skids.

According to another feature of the present invention, a spacing is created during displacement of at least one of the rollers in the common center axis so that, advantageously, the provision of a simple clamping device for conveying the profiles in longitudinal direction is permitted. The formation of this spacing enables the clamping device to travel with its lower clamping part over the entire roller table.

According to still another feature of the present invention, the roller positioned adjacent the stops is so designed as to be liftable by suitable lifting rollers. This is advantageous because such profiles as bulb sections, T sections or angles can be aligned into a horizontal disposition and then conveyed. The lifting rollers are thereby elevated to such an extent that the profiles reach their horizontal disposition which permits a precise and simple handling of the profiles.

Suitably, the clamping device is so configured as to be height-adjustable to thereby enable a clasping of the profiles in a most favorable position according to their size and cross section.

BRIEF DESCRIPTION OF THE DRAWING

The above and other objects, features and advantages of the present invention will now be described in more detail with reference to the accompanying drawing in which:

FIG. 1 is a schematic illustration of an apparatus for the transport of flats, in accordance with the present invention, showing the position of the flats and support rollers after loading the flats on the transport path from the side;

FIG. 1b is a schematic illustration of the profile transport apparatus of FIG. 1a, showing the flats and support rollers after being clamped by a clamping device;

FIG. 2a is a schematic illustration of the profile transport apparatus of FIG. 1a for the transport of bulb sections after being laterally loaded on the transport path;

FIG. 2b is a schematic illustration of the profile transport apparatus of FIG. 2a, showing the bulb sections and the support rollers after being clamped by the clamping device;

FIG. 3a is a schematic illustration of the profile transport apparatus of FIG. 1 for the transport of special sections after being laterally loaded on the transport path;

FIG. 3b is a schematic illustration of the profile transport apparatus of FIG. 2a, showing the special sections and support rollers after being clamped by a clamping device;

FIG. 4a is a schematic illustration of the profile transport apparatus of FIG. 1 for the transport of angles after being laterally loaded on the transport path;

FIG. 4b is a schematic illustration of the profile transport apparatus of FIG. 2a, showing the angles and support rollers after being clamped by a clamping device.

DETAILED DESCRIPTION OF PREFERRED EMBODIMENTS

Figure 5:
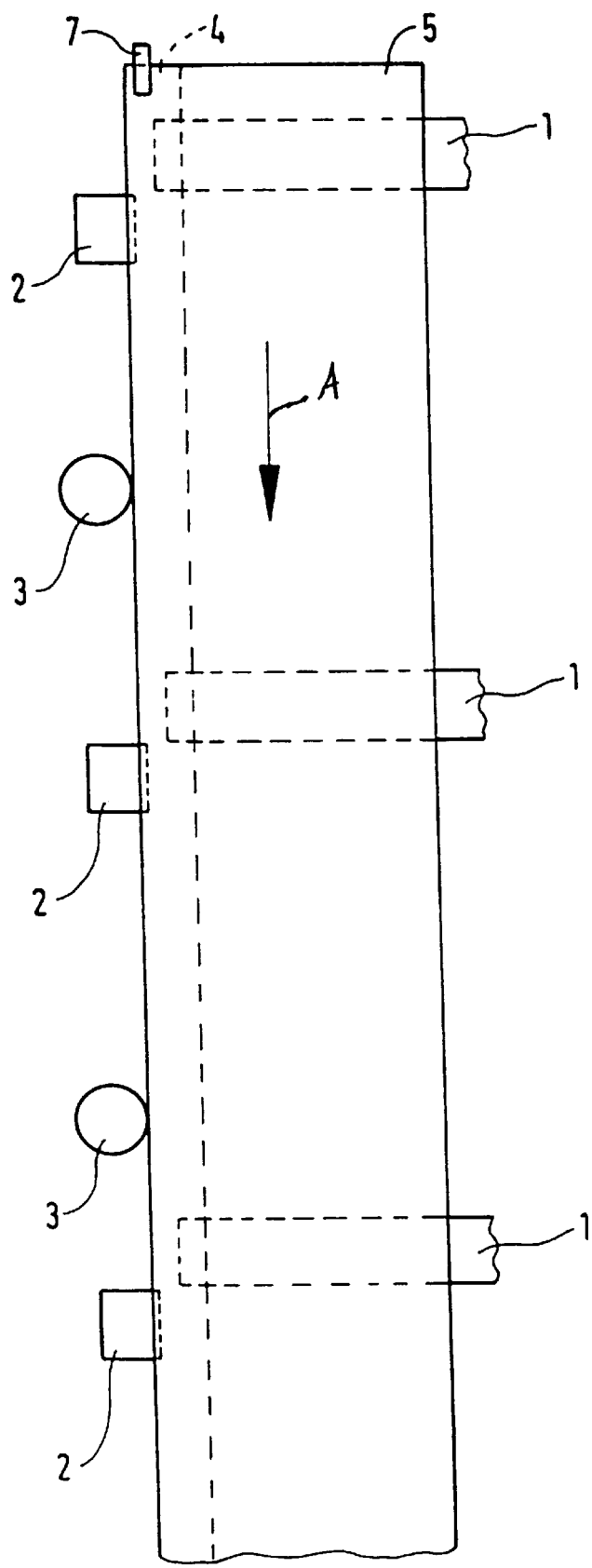
FIG. 5 is a top plan view of the profile transport apparatus according to the present invention.

Throughout all the Figures, same or corresponding elements are generally indicated by same reference numerals.

Turning now to the drawing, and in particular to FIG. 5, there is shown a top plan view of a profile transport apparatus according to the present, including a roller table for the support and transport of profiles, such a flats, T sections, U sections, I sections or bulb sections. The roller table is part of an overall profile processing line which further includes a profile cutting device for cutting and sizing the profile, e.g. by a flame cutter. The profile cutting device is not part of the present invention and thus has been omitted from the drawings for the sake of simplicity.

The roller table is formed by main transport rollers 1 and lifting rollers 2 which are spaced from one another along the length of a transport path for the transport of profiles in the direction of arrow A. Spaced laterally of the transport path are a plurality of stop rollers 3 which form a lateral support for the profiles transferred e.g. via a suitable transverse conveyor, not shown in detail, onto the transport path. As further shown in FIG. 5, if necessary, the rollers 1, 2 can also be positioned offset to one another in the conveying direction A.

Arranged at one end of the transport path is a clamping device 7 which holds the profiles tightly against the stop rollers 3. Although not shown in detail, the clamping device 7 may be suitably formed with upper and lower tracks, each track carrying a carriage which moves to and fro and includes a clamp to clasp the edge of the profile and to guide it along the transport path. However, this clamping device, like much other necessary apparatus, is not part of the invention, and has been omitted from the Figures for the sake of simplicity.

At operation, the profiles to be cut are placed on the support surface of the roller table formed by the rollers 1, 2 via a suitable transverse conveyor and moved firmly against the stop rollers 3. Subsequently, the clamping device 7 is operated to so clasp the profiles as to allow a precise cutting operation.

FIG. 1a is a schematic illustration of the apparatus for the transport of flats 4, 5 of different size and cross section, with the rollers 1 and 2 so designed as to be displaceable relative to one another. The flats 4, 5 are placed on the leveled support surface formed by the rollers 1, 2 and so positioned as to bear against the stop rollers 3. FIG. 1a shows the operating stage after laterally loading the flats 4, 5 on the support surface from the transverse conveyor.

Referring now to FIG. 1b, there is shown a schematic illustration of the profile transport apparatus, showing the flats 4, 5 and the rollers 1, 2 after being clamped and properly positioned by a clamping device 7 which holds the flats 4, 5 tightly against the stop rollers 3. The lifting rollers 2 are then moved in axial direction toward the left so that a spacing 6 is formed between the rollers 1, 2, whereby the lifting rollers 2 are displaced to such an extent that the smaller flat 4 is still able to rest with its opposite axial edges on the rollers 1, 2, whereas the greater flat 5 rests with its left edge on the roller 2 while the remainder is supported by the support rollers 1. The clamping device 7 is then guided for movement into the spacing 6 between the rollers 1, 2 for clasping the one ends of the flats 4, 5.

FIG. 2a is a schematic illustration of the profile transport apparatus of FIG. 5 for the transport of two bulb sections 8, 9 after being laterally loaded on the transport path, with the rollers 1, 2 abutting one another and with the bulb sections moved into a position bearing against the stop rollers 3, with the bulb of the bulb sections 8, 9 facing downwards. The displacement of the bulb sections 8, 9 against the stop rollers 3 can be easily accomplished as the rollers 1, 2 form a leveled uninterrupted support surface.

As shown in FIG. 2b, the lifting rollers 2 together with the supported margin area of the bulb section 8 is moved upwardly and at the same time shifted to the left, until the shank of the bulb section 8 is aligned horizontally, with the bulb facing downwards and bearing upon the roller 1. This is advantageous e.g. because it allows formation of a precise, perpendicular cutting edge during sizing of the bulb profile 8. The greater bulb profile 9 can be elevated in a same manner by further lifting the lifting rollers 2 upwards.

FIG. 3a is a schematic illustration of the profile transport apparatus of FIG. 5 for the transport of specially-shaped sections 10, 11 which are laterally loaded onto the abutting rollers 1, 2 and placed against the stop rollers 3. As a clasping of the profiles 10, 11 is possible also from outside the area of the rollers 1, 2, the abutting disposition of the rollers 1, 2 is maintained during the transport, as shown in FIG. 3b.

Also the angles 12, 13 according to FIG. 4a may be simply placed on the support surface formed by the abutting rollers 1, 2 and pushed or drawn against the stop rollers 3. The profiles 12, 13 can be raised in upright, horizontal disposition by the lifting rollers 2, by moving the lifting rollers 2 to the left and upwards, as shown in FIG. 4b. In this case, as spacing 6 is created between the 1, 2 in order to enable a processing of the angles 12, 13, without damaging the rollers 1, 2, e.g. for providing a serrated edge. The outer margin of the angle 13 can be supported by upwardly lifting the lifting rollers 2 further along the line 14.

While the invention has been illustrated and described as embodied in an apparatus for transporting profiles, it is not intended to be limited to the details shown since various modifications and structural changes may be made without departing in any way from the spirit of the present invention.

What is claimed as new and desired to be protected by letters patent is set forth in the appended claims:

What is claimed is:

1. Apparatus for transporting profiles of different size and cross section, such as flats, angles, I sections, U sections, T sections and bulb sections, in longitudinal direction along a transport path, said apparatus comprising:

a plurality of stops laterally arranged along one side of the transport path;

a clamping device movable in direction of the transport path, support elements for placing profiles thereon and for supporting the profiles transported along the transport path; each of said support elements being formed by two supporting rollers having ends in abutting disposition with each other, and wherein at least the end of one of the two supporting rollers is displaceable relative to the other one for a spaced disposition of the rollers.

2. The apparatus of claim 1 wherein the two rollers are positioned at a spacing from one another for allowing passage of the clamping device during transport of the profiles.

3. The apparatus of claim 1 wherein one of the rollers adjacent the stop mechanism is capable of being lifted.

4. The apparatus of claim 1 wherein the clamping device is height-adjustable.

5. The apparatus of claim 1 wherein the rollers are arranged offset to one another.

* * * * *